Oct. 11, 1966 R. RUPERT 3,277,535
MOLDING APPARATUS FOR REFLECTING DEVICES
Filed Oct. 21, 1963
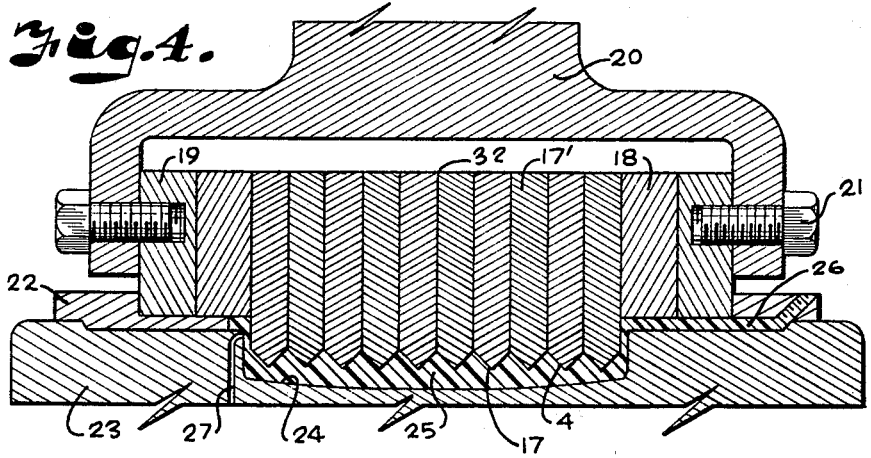
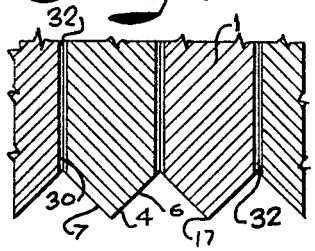
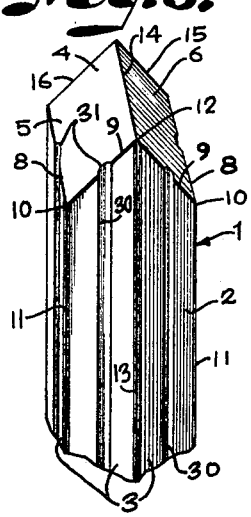
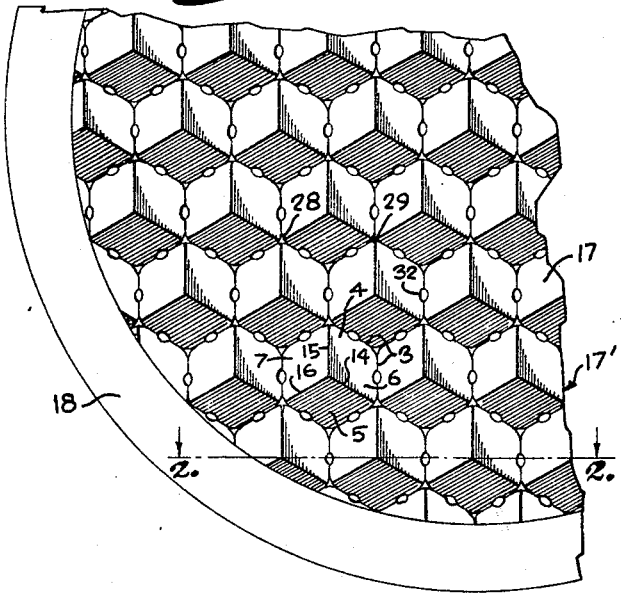
INVENTOR.
RICHARD RUPERT
BY
*Fishburn and Gold*
ATTORNEYS

United States Patent Office 3,277,535
Patented Oct. 11, 1966

3,277,535
MOLDING APPARATUS FOR REFLECTING
DEVICES
Richard Rupert, Blue Springs, Mo., assignor, by mesne assignments, to Continental Reflectors, Inc., Blue Springs, Mo., a corporation of Missouri
Filed Oct. 21, 1963, Ser. No. 317,475
7 Claims. (Cl. 18—44)

This invention relates to the art of molding, and more particularly to improvements in apparatus for molding high quality reflecting devices.

Broadly stated, the reflecting devices referred to herein comprise a transparent molded structure having a plurality of accurately shaped prismatic depressions forming a series of total reflecting surfaces arranged relatively with respect to each other so as to reflect light back towards the light source. The reflectors are formed in a mold having a matrix comprising a series of pins or mold elements grouped in mutual engagement. The elements each have on one end thereof forming faces which are very accurately flat and carefully located with respect to adjacent locating faces for producing the reflecting surfaces in the molded material.

The pins or mold elements are generally elongated and of hexagonal cross-section with slightly rounded corners where adjacent side (locating) faces of the element meet. When the elements are grouped together to form the mold matrix, the rounded corners of adjacent elements cooperate to form small longitudinally extending vent passageways through which some entrapped air can escape from the mold matrix face when the molding material is under pressure thereagainst. These vents must be very small to prevent the molding material from running thereinto and causing blockage.

High-speed molding of such reflecting devices has heretofore been hindered because the air cannot escape fast enough from the rounded corner formed vents to permit the mold matrix face to completely fill with the mold material in time. Without absolutely complete filling, very pronounced deterioration in the reflecting ability of the molded product results due to nonflat reflecting faces, poor face finishes and dull face edges. In some instances, air is trapped at the mold matrix face even with slow mold filling, resulting in poor and sometimes unusable reflectors.

The principal objects of the present invention are: to provide reflector mold apparatus having additional matrix venting passageways for supplementing the rounded corner formed vents so as to permit high-speed molding practices with consistent high quality reflector production; to provide such venting passageways which allow rapid and complete mold filling without significant disfiguration of molded reflecting surfaces; to provide an improved mold matrix element adapted to cooperate with adjacent similar matrix elements to form longitudinal vent passageways at effective positions between contacting locating faces; to provide such a mold matrix element configuration which is easily formed and permits accurate dimensional control of the resultant locating face vents; to provide such mold elements which tend to fit more accurately into bundles for forming the mold matrix; and to provide an improved mold element matrix which may be formed without a significant increase in mold costs.

Other objects and advantages of this invention will become apparent from the following description taken in connection with the accompanying drawings wherein are set forth by way of illustration and example certain embodiments of this invention.

FIG. 1 is a fragmentary face view showing a mold matrix face comprised of grooved pins or mold elements in locating face engagement forming vent passageways (exaggerated in relative size) therebetween.

FIG. 2 is a fragmentary cross-sectional view through a mold matrix taken on the line 2—2, FIG. 1, showing the locating face vent passageways (exaggerated in relative size) therebetween.

FIG. 3 is a fragmentary perspective view, on an enlarged scale from that of FIG. 1, of a mold element showing longitudinal grooves (exaggerated in relative size) on the locating faces thereof.

FIG. 4 is a cross-sectional view through a reflector mold embodying features of the present invention on a scale reduced from that of FIG. 1 and showing mold material therein.

Referring to the drawings in more detail:

The reference numeral 1 generally indicates a pin or mold element comprising an elongated body 2 of hexagonal cross-section along the length thereof. The body 2 forms six planar longitudinal locating faces 3 adapted to respectively contact similar locating faces on adjacent similar mold elements for mutual positioning of the mold element 1 with respect to the adjacent elements. The body 2 is provided at an end 4 thereof with three planar operating faces 5, 6 and 7 extending in accurate angular relation to each other and to the longitudinal locating faces 3. The operating faces 5, 6 and 7 form sharp or abrupt peripheral edges 8 and 9 with respective adjacent pairs of locating faces 3. The peripheral edges 8 and 9 formed by each face 5, 6 and 7 respectively intersect at points 10 with respective edges 11 formed between the pair of locating faces 3 which join the respective operating face. The peripheral edges 8 and 9 of adjacent operating faces intersect at points 12 with respective edges 13 formed between a pair of adjacent locating faces 3 associated respectively with adjacent operating faces.

The operating faces 5, 6 and 7 extend in angular relation to each other as three intersecting faces on the corner of a cube and form sharp internal edges 14, 15 and 16 therebetween. The operating faces 5, 6 and 7 are adapted to cooperate with similar operating faces on adjacent similar mold elements to form a reflector mold matrix face 17 when the mold elements are held in a group comprising a matrix 17'. In the illustrated example, the mold elements are mounted in a ring 18 secured to a carrier 19 which, in turn, is secured to a mold plunger 20 by suitable fastening devices such as screws 21. A ring 22 is arranged on the mold body 23 and is adapted to cooperate with the ring 18 to produce a seal therebetween when the plunger 20 is moved toward the mold body 23 for closing the mold. A mold cavity 24 is located between the matrix face 17 and mold body 23 corresponding to the reflecting device 25 to be formed. The ring 22, in the illustrated example, has a suitable gate passageway 26 through which the molten molding material is forced into the cavity 24 and suitable vent passageways 27 are provided in the mold body 23 to permit the major portion of air trapped in the mold to exit therefrom as the mold material moves laterally cross the cavity 24 from the gate passageway 26.

In operation, mold material, for example a transparent synthetic thermoplastic resin, is forced under pressure into the cavity 24 and forms prismatic depressions corresponding to the operating faces 5, 6 and 7 of each mold element in the matrix face 17. After the mold material has set sufficiently to retain its shape without slumping or distortion, the plunger 20 is drawn away from the mold body 23 and the finished reflecting device is removed from the mold cavity.

The side edges 11 and 13 of the mold elements are slightly rounded forming a vent passageway 28 at the intersection of any three contacting mold elements in the mold matrix (shown exaggerated in size, FIG. 1). The adjacent operating faces on said three contacting mold elements form a cavity 29 for receiving the molding material, the peripheral edges 8 and 9 of each operating face being depressed into the cavity or, in other words, toward the mold elements making up the matrix face 17. The peripheral edges 8 and 9 of each operating face are adapted to rest adjacent similar peripheral edges on contacted mold elements for closing the bottom of the cavities 29. This is in contrast to the internal edges 14, 15 and 16 of the respective mold elements which protrude outwardly from the mold elements or matrix face 17.

The radius of the side edges 11 and 13 is carefully controlled so that the resultant vent passageways 28 are small enough in maximum cross-sectional dimension to prevent the mold material from entering thereinto under the pressure and heat conditions found in the mold. The mold material thus bridges across the mouth of the passageways 28 and is completely removed as part of the reflecting device when it is removed from the mold. Due to the cross-sectional size limitation of the vent passageways 28, molding speed is limited because sufficient air cannot be bled therethrough in a short period of time to properly fill the cavities 29. Also, air is sometimes trapped in matrix face positions where it cannot bleed out through the passageways 28.

To alleviate these drawbacks, a fractional circular continuous groove 30 (shown exaggerated in size) is formed in each of the locating faces 3 and extends longitudinally therealong, bisecting same. The grooves 30 are preferably simultaneously formed in the mold elements by means of a suitably shaped draw die at the same time the elements are sized to the desired accurate hexagonal cross section and before the operating faces 5, 6 and 7 are cut. In the finished mold element, each of the grooves 30 originates at a peripheral edge 8 or 9 producing a pair of slight edge openings 31 in the respective operating face and extends outwardly from the mold material along a locating face 3 to an exterior end surface 34 at the opposed end portion 35 of the element 1 from the operating faces 5, 6 and 7 to provide venting communication from the operating faces 5, 6 and 7 to an area adjacent said end surface 34.

When the mold elements are grouped together to form the matrix 17', the respective grooves 30 become aligned with adjacent grooves on the locating faces of adjacent mold elements forming elongated venting passageways 32 communicating with the cavities 29 intermediate the respective peripheral edges 8 and 9. The grooves 30 respectively have a depth not greater than one-half the maximum permissible diameter of a vent passageway which blocks mold material flow thereinto under molding conditions necessary for making high production reflecting devices. A suitable depth for the grooves 30 has been found to be about .0005 inch.

The resulting venting passageways 32 allow sufficient cross-sectional vent area for the air trapped in the cavities 29 to escape rapidly enough for high-speed molding operations without permitting blockage of any of the passageways with the molding material. Also, the positioning of the passageways 23 permits the removal of any air pockets which may not communicate with the passageways 28. Further, it has been determined that the use of the venting passageways 32 results in reflector devices with flatter reflecting faces, better finish and sharper edges formed at the peripheral edges 8 and 9 of the matrix face 17. The formation of the grooves 30 in the respective mold elements has been found to add very little to the cost of mold matrix production but the resulting venting passageways 32 permit a significant increase in product output rate and quality. A further advantage of the grooves 30 in the respective mold elements is that the elements locate with respect to each other more accurately in the matrix because the absence of central surface on the respective mating locating faces avoids the possibility of the elements rocking on each other.

It is to be understood that while one form of this invention has been illustrated and described, it is not to be limited to the specific form or arrangement of parts herein described and shown except insofar as such limitations are included in the claims.

What I claim and desire to secure by Letters Patent is:

1. A mold matrix pin adapted to be grouped with similar mold elements to form a reflector mold matrix, said element comprising, a body of polygonal cross section along at least a portion thereof forming a plurality of locating faces, said body being provided at an end thereof with a plurality of operating faces forming a peripheral edge with said locating faces and an opposed end portion with an exterior end surface, said locating faces having grooves extending therealong and originating at said peripheral edge producing an edge vent opening in said operating face and extending to said exterior end surface to provide communication between the operating faces and the exterior surface.

2. The mold pin as set forth in claim 1 wherein said body is of hexagonal cross section providing six locating faces and wherein said operating faces are planar and three in number and extend in angular relation to each other as a corner of a cube.

3. The mold pin as set forth in claim 1 wherein said groove bisects the respective locating face.

4. The mold pin as set forth in claim 1 wherein said groove is positioned to align and cooperate with a similar groove on an adjacent similar mold element to form a vent passageway, said groove having a depth not greater than one-half the maximum cross-sectional dimension of a vent passageway which blocks mold material flow thereinto under high-speed molding conditions for making reflecting devices.

5. A mold element matrix comprising, a group of mold elements each having an elongated body of hexagonal cross section along at least a portion thereof, said portion having six planar longitudinal locating faces adapted to respectively contact locating faces of adjacent mold elements for mutual positioning of said mold elements with respect to said adjacent elements, said body being provided at an end thereof with a plurality of planar operating faces extending in angular relation to said longitudinal locating faces and forming peripheral edges therewith, said peripheral edges being adapted to rest adjacent peripheral edges on adjacent mold elements, said operating faces being adapted to cooperate with operating faces on adjacent mold elements to form a reflector mold matrix face with said peripheral edges depressed thereinto producing spaced cavities for receiving thermoplastic material to be molded, said body having an opposed end portion with an exterior surface thereon, said longitudinal locating faces each having an elongated groove extending longitudinally therealong and bisecting same, each of said grooves originating at one of said peripheral edges forming a slight edge opening in the respective operating face, said groove extending to the exterior surface of the opposed end portion, said grooves being alignable with respective similar grooves on locating faces of adjacent mold elements to form elongated venting passageways providing communication between said cavities and the exterior surface at the opposed end portion along said peripheral edges, said passageways having a maximum cross-sectional size not greater than the maximum size of a passageway which blocks mold material flow thereinto under high-speed molding conditions for making reflecting devices and a carrier means in contacting abutting relation with at least one of the longitudinal locating faces of the exterior mold elements of said mold matrix to retain the longitudinal locating faces of adjacent mold elements within the mold matrix in abutting contacting relation to thereby form a matrix for utilization in a molding operation.

6. A molding assembly comprising:
(a) a group of mold elements, each having an elongated body having a plurality of longitudinal locating faces disposed about said body, said body being provided at one end portion thereof with a plurality of operating faces forming a peripheral edge with said locating faces and an opposed end portion with an exterior end surface, each of said elements having a longitudinally disposed groove in each of said locating faces originating at said peripheral edge producing an edge vent opening in said operating face and extending to said exterior end surface to provide communication between the operating faces and said exterior surface, said mold elements being disposed in a matrix having their longitudinal locating faces in abutting contact with the longitudinal locating face of an adjacent element with said grooves in said longitudinal locating faces being aligned to provide an aperture extending from the operating faces to the exterior end surface of the molding elements to permit the escape of entrapped air during the molding process from the operating faces outwardly through said grooves, (b) a carrier means disposed in abutting contact to at least one of the locating faces of the exterior mold elements of said mold matrix to retain the various mold elements in abutting, contacting relation to adjacent mold elements to form said molding matrix, (c) a plunger means operatively connected to said carrier means, said plunger means having a surface in spaced relation from said exterior end surface of the mold elements to allow the escape of entrapped air from said grooves to the exterior.

7. A mold assembly as recited in claim 6 wherein the apertures formed by the aligned grooves in the longitudinal locating faces of adjacent mold elements have a maximum cross-sectional dimension which blocks the flow of a molding material therein under high speed molding conditions for the making of reflecting devices.

References Cited by the Examiner
UNITED STATES PATENTS

| | | | |
|---|---|---|---|
| 595,274 | 12/1897 | Soper | 18—44 XR |
| 881,912 | 3/1908 | Emrick. | |
| 2,266,831 | 12/1941 | Tegarty. | |
| 2,924,851 | 2/1960 | Birckhead et al. | 249—141 |

J. SPENCER OVERHOLSER, *Primary Examiner.*

J. HOWARD FLINT, *Examiner.*